(12) United States Patent  
Koenders

(10) Patent No.: US 6,234,291 B1  
(45) Date of Patent: May 22, 2001

(54) SAFETY DEVICE FOR A WORKSHOP MACHINE

(76) Inventor: Andreas Albertus Maria Koenders, Jonkheer Ramweg 15, NL-3998 JP, Schalkwijk (NL)

( * ) Notice: Subject to any disclaimer, the term of this patent is extended or adjusted under 35 U.S.C. 154(b) by 0 days.

(21) Appl. No.: 09/230,082

(22) PCT Filed: Jul. 14, 1997

(86) PCT No.: PCT/NL97/00416

§ 371 Date: Oct. 18, 1999

§ 102(e) Date: Oct. 18, 1999

(87) PCT Pub. No.: WO98/03816

PCT Pub. Date: Jan. 29, 1998

(30) Foreign Application Priority Data

Jul. 19, 1996 (NL) .................................................. 1003640

(51) Int. Cl.⁷ .................................................. F16P 3/00
(52) U.S. Cl. .................................................. 192/134; 192/133
(58) Field of Search .................................................. 192/134, 133, 192/135, 129 A; 100/349

(56) References Cited

U.S. PATENT DOCUMENTS

| | | | |
|---|---|---|---|
| 4,060,160 | * 11/1977 | Lieber | 192/134 |
| 4,179,987 | * 12/1979 | Dohm | 192/133 X |
| 4,307,798 | * 12/1981 | Watanabe | 192/133 |
| 4,527,684 | * 7/1985 | Eggeman et al. | 192/134 X |

FOREIGN PATENT DOCUMENTS

2307375  * 9/1974 (DE).  
88 10 390  * 2/1990 (DE).

* cited by examiner

Primary Examiner—Rodney H. Bonck  
(74) Attorney, Agent, or Firm—Young & Thompson

(57) ABSTRACT

A safety device for a workshop machine contains a safety screen which is equipped with a powering device in order to lower the screen before the machine starts to operate. The powering device contains friction rolls on opposite sides of the screen and are coupled to a drive motor. The screen is equipped on both its top side and its bottom side with approach switching apparatus which, when moved, gives off an electric signal to a central processing unit. The central processing unit is capable of controlling the drive motor in accordance with the signals given off by the approach switching apparatus.

7 Claims, 1 Drawing Sheet

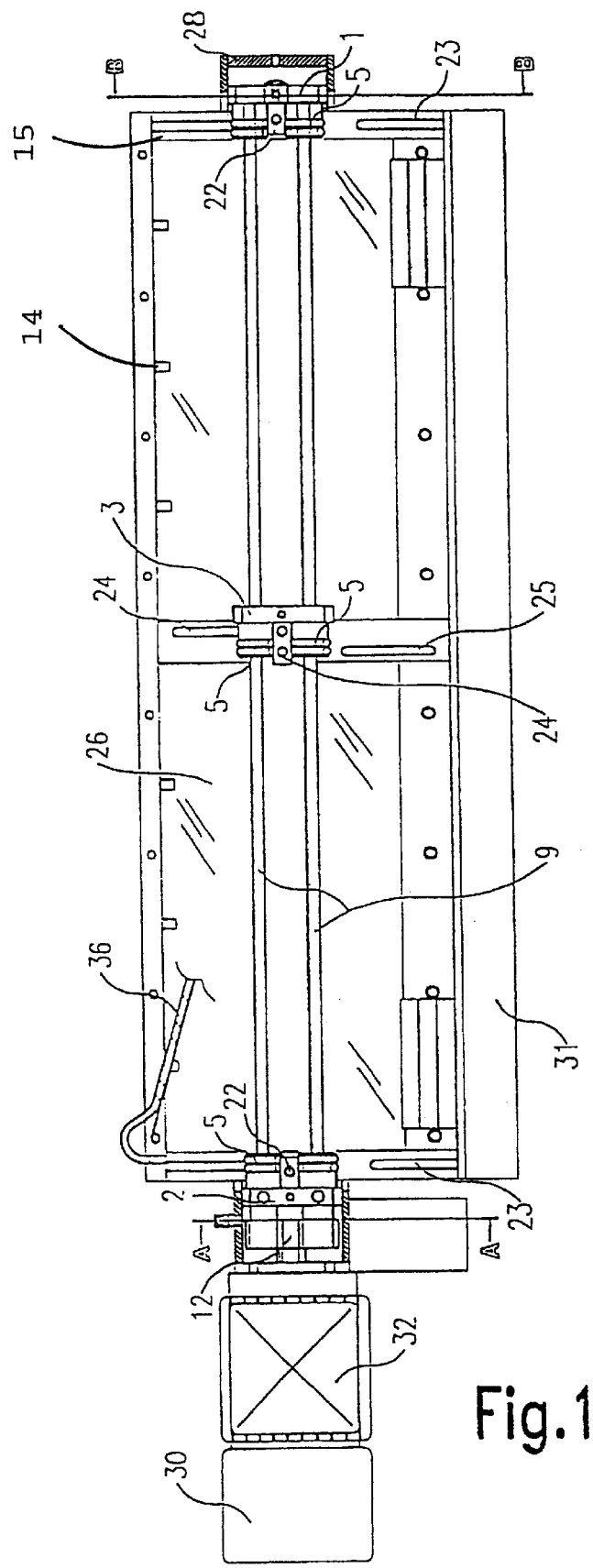
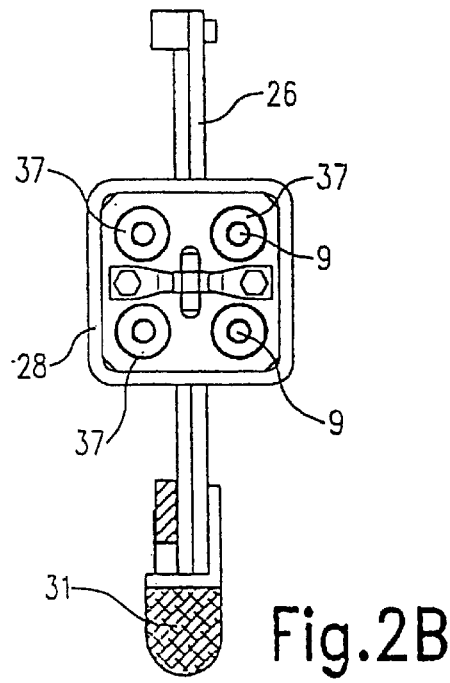
Fig.2B
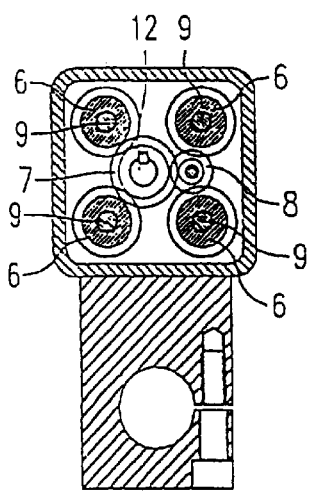
Fig.2A
Fig.1

US 6,234,291 B1

SAFETY DEVICE FOR A WORKSHOP MACHINE

BACKGROUND OF THE INVENTION

The invention relates to a safety device for a workshop machine containing a safety screen which is equipped with powering means in order to lower the screen before the machine starts to operate.

DESCRIPTION OF THE RELATED ART

In itself it is known, often inspired by national legislation, to equip workshop machines such as milling devices and eccentric presses with a safety device in the form of a screen which closes automatically before the machine starts to operate. In this manner the machine is screened off during operation and this prevents people coming into contact with the operating machine. The safety screen also protects bystanders from any chips of material thrown off by the machine, which plays a role in particular in milling, sawing, drilling and similar devices.

The known safety screen is operated by means of a pressure cylinder which is powered either pneumatically or hydraulically. This known screen then drops within the order of one or more seconds. The electronics which are present contain a time switch which ensures that the screen is immediately raised if an end point detector at the bottom of the screen has remained untouched at the end of that time. In this manner it is avoided that the machine can start to operate while the screen has not completely closed, for example as a result of the intervention of an arm, hand or any other obstacle.

A disadvantage of this safety device, however, is the relatively long time which is involved in lowering the screen, during which the machine is in principle unnecessarily out of operation. Especially in the case of an obstacle in the path of the screen, one must wait at least three times this time before the machine is operational again.

SUMMARY OF THE INVENTION

The present invention therefore aims at equipping a device of the kind mentioned in the opening paragraph with a safety screen which both closes and reacts considerably faster.

In order to achieve the intended aims a device of the kind described in the opening paragraph is characterised according to the invention in that the powering means contain friction rolls at opposite sides of the screen which are coupled to a drive motor, in that the screen is equipped at the top side and the bottom side with approach switching means which, when touched, give off an electrical signal to a central processing unit, and in that the central processing unit is able to control the drive motor in accordance with the signals given off by the approach switching means. In practice it turns out that friction rolls, as applied in accordance with the invention, are capable of completely closing or raising the screen in no longer than a fraction of a second. The approach switch at the bottom side furthermore ensures that in the event of an obstacle in the path of the screen a signal can immediately be sent to the central processing unit to raise the screen again, so that one does not have to wait a complete time cycle for that, as in the case of the known device. The device according to the invention can as a result of this, even in the case of an obstacle, nevertheless be operational within a second, which is many times faster than the known device.

In a preferable embodiment the device is characterised according to the invention in that the approach switching means contain a strip at the bottom side of the safety screen which extends over at least virtually the full width of the screen. With such a construction one can achieve the fact that the approach switching means are sensitive across virtually the entire width of the screen, while only a limited number or even just one switching element is required, which can be mounted locally.

A special embodiment of the device is characterised according to the invention in that the friction rolls contain a number of pairs of wheels which are always placed in pairs on opposite sides of the screen at regular distances from one another and which are coupled to the drive motor by means of a common shaft. Such friction rolls, which are more in particular covered with a rubber, whether or not natural, turn out in practice to suffice extremely well and in this manner even form an adequate guide for the screen.

BRIEF DESCRIPTION OF THE DRAWINGS

The invention relates furthermore to a workshop machine equipped with such a safety device and will now be explained further on the basis of an implementation example and an appertaining drawing, in which:

FIG. 1 shows a longitudinal cross section of an embodiment of a safety device according to the invention;

FIG. 2A gives a transverse cross section of the device of FIG. 1 according to the line A—A; and FIG. 2B gives a transverse cross section of the device of FIG. 1 according to the line B—B.

DESCRIPTION OF THE PREFERRED EMBODIMENT

The figures are, for the rest, purely schematic and not drawn to scale. Some dimensions in particular may be shown (strongly) exaggerated for the sake of clarity. The same parts are shown in the figures as far as possible with the same reference figure.

The safety device of FIG. 1 contains a safety screen 26 which is destined to screen off a workshop machine placed behind it, which is not drawn here. The safety screen is equipped with powering means in the form of a drive motor 32 which lowers the screen before the machine starts to operate. The machine and the safety device are thereby coupled electronically in such a manner that the machine can only start to operate if the screen 26 is fully lowered. The screen has a size typically of approximately 30–400 by 30–200 by 0.6–1.2 cm as concerns length, width and thickness, while the invention is obviously not limited in any respect to particular dimensions.

For the benefit of the operation of the screen an exit shaft 12 from the motor 32 is coupled via a gearbox 6 . . . 8 to four driving shafts 9 which run in pairs on opposite sides of the screen, see in this connection also FIGS. 2A and 2B, and which are received at their extremities in an end cap 28 fixed in bearings. On the shafts 9 there are friction rolls 5 at regular distances, in this example with wheels covered in rubber, which are located in a slightly gripping manner against the screen. At various places the shafts 9 run through bearing blocks 1 . . . 3 with roller bearings 37 in order to restrict the rolling resistance and wear and in order to fix the shafts in an exact manner. In practice such a construction turns out to be capable of bringing the screen 26 within a fraction of a second from its topmost position to its bottommost position or vice-versa.

For the control of the device the screen is equipped with various approach switching means. For example, both at the top side of the screen and on its bottom side an approach switch 24 and 25 respectively are included, both of which co-operate with the sensor strip 14 in the middle of the screen. In the topmost position of the screen approach switch 25 will thereby co-operate with the sensor strip 14, while in the bottom-most position it will be the other approach switch which co-operates with the sensor strip 14 in order to register the position of the screen. Such a co-operation can consist, for example, of a physical contact which is made or can take place without contact, for example optically by means of an opto-coupler or magnetically by means of a Reed contact. For the benefit of the double, and in this case even triple, security, similar approach switches 22, 23 and sensor strips 15 are also attached to the ends of the screen, which must each always individually provide the same signal. The various electrical signals which are to be given off by the approach switching means 22 . . . 25 are provided via a flexible bundle of cables 36 to a central processing unit 30, which contains an electronic circuit which may or may not be totally integrated, in order to control the electro-motor 32 in accordance with the signals given off by the approach switch elements 22 . . . 24.

In order to be able to react in an adequate manner to the intervention of a hand, arm or any other obstacle in the path of the screen the approach switching means also contain a pressure-sensitive strip 31 which extends across the full width of the screen. If, when the screen 26 is closed, the screen bumps against something, then this is immediately detected by means of the strip and passed an to the central processing unit via the bundle of cables 36. On the basis of this signal the screen 26 can immediately be returned to its starting position in its topmost position in order to free the obstacle. As soon as the obstacle has been removed the device can be made operative again. The delay which is incurred as a result of all this can thus be limited to the time involved in the various movements of the screen 26, which strictly speaking do not need to last for longer than a period in the order of one or a few seconds.

In practice the design of the safety device according to the invention shown here provides an extremely effective and reliable screening and protection of generally dangerous workshop machines, such as milling devices, eccentric presses, sawing machines, lathes and the like. Nevertheless, the invention is by no means limited to the example given here. On the contrary, there are many other variants and designs possible for an expert without leaving the framework of the invention. For example, the number of shafts and the number of friction rolls can be increased or reduced, depending on the specific dimensions of the screen. The friction rolls can also each be driven separately, whether or not in pairs, instead of by means of a communal shaft. The number of sensors on the screen can be extended for the benefit of an increased reliability or functionality but may, be it often at the expense of the latter, also be reduced. However, the invention always provides a device which is capable of reacting extremely adequately and fast to potentially dangerous situations.

What is claimed is:

1. Safety device for a workshop machine, comprising:

a safety screen having left, right, top, and bottom sides, a powering means operatively connected to the safety screen for lowering the screen before the machine starts to operate, the powering means including a drive motor, a central processing unit, friction rolls coupled to the drive motor and located at both the left and right sides of the screen an approach switching means attached to the top side and the bottom side of the screen and which, when touched, give off an electric signal to the central processing unit, the central processing unit being capable of controlling the drive motor in accordance with the drive signals given off by the approach switching means.

2. Safety device according to claim 1, characterised in that the approach switching means contain a pressure sensitive strip at the bottom side of the safety screen which extends over at least virtually the full width of the screen.

3. Safety device according to claim 2, characterised in that the friction rolls contain a number of pairs of wheels which are always placed in pairs on opposite sides of the screen at regular distances from each other and which are coupled to the drive motor by means of a communal shaft.

4. Safety device according to claim 3, characterised in that the friction wheels are covered with a natural or synthetic rubber material.

5. Safety device according to claims 1, characterised in that the friction rolls contain a number of pairs of wheels which are always placed in pairs on opposite sides of the screen at regular distances from each other and which are coupled to the drive motor by means of a communal shaft.

6. Safety device according to claim 5, characterised in that the friction wheels are covered with a natural or synthetic rubber material.

7. Workshop machine equipped with a safety screen according to claim 1.

* * * * *